Patented Sept. 3, 1946

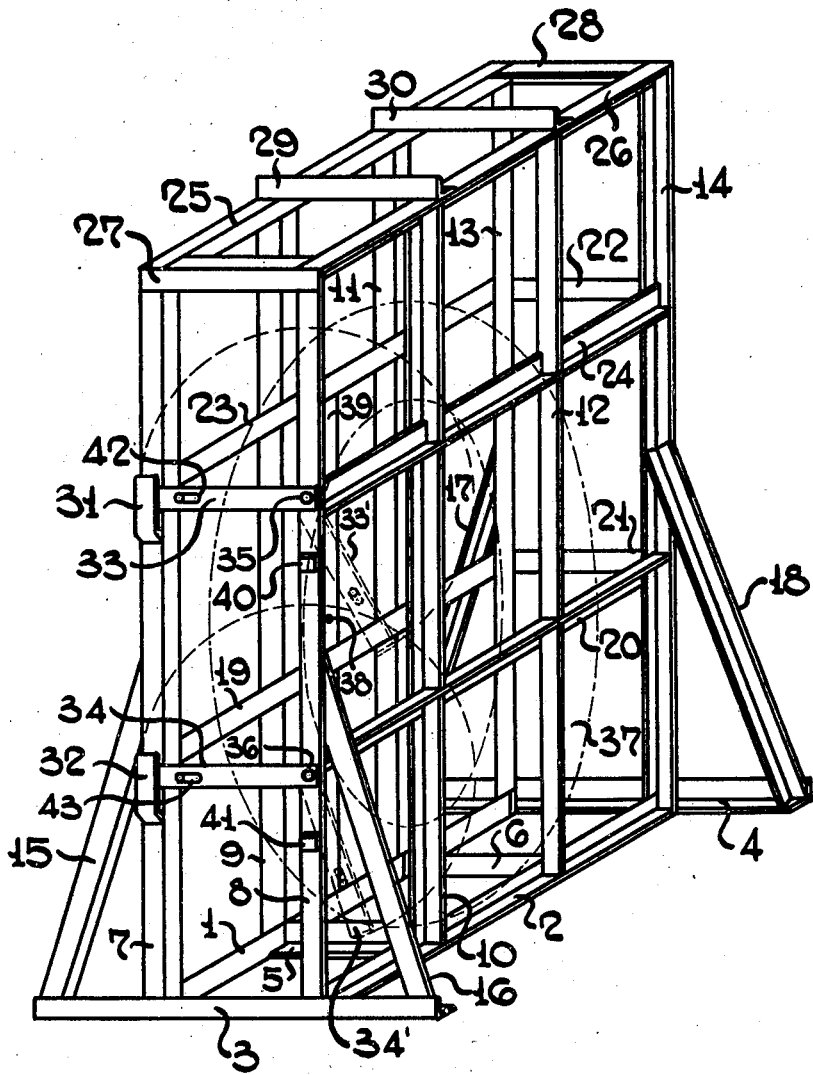

2,407,049

UNITED STATES PATENT OFFICE 2,407,049

TIRE INFLATION GUARD

Nathan Winarsky and Benjamin Winarsky, Newark, N. J., assignors to Belmont Body Builders, Newark, N. J., a partnership Application August 9, 1945, Serial No. 609,894

5 Claims. (Cl. 109—49.5)

The present invention deals with a safety device known as a tire inflation guard. Usually, ordinary passenger automobile tires involve little hazard, during inflation, although there have been incidents reported wherein tires burst because of overinflation or defective casings. This danger in the case of truck and airplane tires is more prevalent, due to the higher pressures and larger tires employed. Since such tires cost a great deal more than passenger tires, there is also the tendency to try to make them last longer, so that there is a greater possibility of encountering defective carcasses. Many instances have been known in which such tires have exploded from internal pressure during inflation, causing not only injury, but also death to the operators as well as individuals who happened to be in the vicinity at the time. Truck tires also have locking rings on the rims which lock the tire and rim in place upon inflation. In many instances, this ring has been known to expand and spring open, even though believed to be in locked position, thus causing bodily injury.

The device of the present invention is not developed to prevent the bursting of tires, but to safeguard the personnel and others against possible injury or death in the event of a failure of a tire carcass to hold the air pressure which is fed into it.

The invention would be best understood by reference to the drawing which gives a perspective and diagrammatic view of a type of device which would exemplify the invention involved. In the figure, all of the metal members, with the exception of a few (which will be designated) are made of angle iron stock of sufficiently large dimensions to withstand the driving force of the tires upon explosion. We find it preferable to employ 1½" x 1½" x ¾₁₆" angle iron, although somewhat smaller sizes and also larger stocks may be used.

Numerals 1 and 2 represent two angle iron members wide enough apart to receive the widest tire to be inflated. For truck tires, we find that a width of 12 inches is generally satisfactory. Welded to the ends of these are two members 3 and 4, thus forming a base for the cage structure. The latter two members have protruding ends (protruding, roughly about 7 inches) to prevent the structure from capsizing upon impact. Members 5 and 6 are welded to 1 and 2, to give, roughly, equidistant spacing between 3 and 4. These members 5 and 6 not only act as reinforcement, but they also serve as guides or stops to keep the tire fixed in place while it is being inflated. The tire is outlined in dotted lines and is designated by numeral 37.

Welded to the base, preferably at junctures with other members, are upright members 7, 8, 13 and 14, while between them, equally spaced and welded to members 1 and 2 are uprights 9, 10, 11 and 12, while at right angles to them, and preferably equally spaced are horizontal members 19, 20, 23 and 24. Forming the top of the structure are members 25 (welded to the ends of members 7, 9, 11 and 13), and 26 (welded to tops of 8, 10, 12 and 14). Then end members 7 and 8 are joined at the top by member 27, while end members 13 and 14 are similarly joined by member 28. Spaced equidistantly between 27 and 28 are members 29 and 30, welded on to top members 25 and 26. In a similar manner, the side members 21 and 22 are welded to corner members 13 and 14. The protruding ends of base members 3 and 4 are reinforced by struts 15, 16, 17 and 18. Base members 3 and 4 may also be provided with means for fastening them to the floor or foundation.

Between members 7 and 8 are located bar members 33 and 34 for allowing entry of the tire into the structure. Both bar members are pivoted on member 8 at points 35 and 36, and their free ends are locked in clasps 31 and 32 which are welded on member 7. Knobs 42 and 43 are provided for lifting members 33 and 34 and swinging them to positions indicated by 33' and 34'. Stops 40 and 41 may be welded on member 8 to prevent bars 33 and 34 from swinging in the open positions.

In the operation of the device, bar members 33 and 34 are swung into the open position and the tire or wheel having a tire mounted thereon is rolled inside the structure. Then the members 33 and 34 are locked into closed position and the tire is inflated. In the event of explosion, not only the tire carcass, but also the rim are retained within the structure, thereby preventing bodily injury to the operator and those within normal striking distance of the exploding tire.

In order to adequately take care of inflation of tires mounted on disk-type wheels, upright bar member 39 is welded to members 1, 19 and 23, equidistant between members 9 and 11 and extending from the base to member 23. Hole 38 is cut out in member 39 to accommodate a stud which is inserted through opening 38 into the disk wheel hub. This is to further anchor such wheels which weigh considerably more than tire and rim assemblies and thus offer greater safety hazards.

For general truck tire use, we find the following linear dimensions most satisfactory: Members 1 and 2, 46–48 inches long, 3 and 4 about 29 inches, and members 7, 8, 9, 10, 11, 12, 13 and 14 may be about 46–48 inches.

Instead of members 33 and 34, it is also possible to employ a solid steel plate door having the width and length of the space between members 33 and 34, hinged on member 8 and locked in closed position by a latch or lock on member 7.

It will be observed that structural iron members are employed. These may be bar stock, angle, T, channel, and the like, the strongest directional strain-resisting portion being on the inside of the structure, preference, however, being in maintaining a smooth interior to prevent interference while rolling the tire into the cage. Although a circular shape is possible for this structure, we have described the simplest, cheapest, and most readily constructed design. Other metals, laminated plastics and even plywood may be employed to reduce the weight and effect other advantages. The device is portable and may be mounted on a service truck, if desired.

Although the inflation guard shown in the drawing is fixed to hold a tire vertically (which is the preferred position since it occupies the least floor space and enables the tire to be rolled in), the assembly may be employed with the smaller dimension in the vertical position.

We claim:

1. A tire inflation guard for preventing accidents during truck tire inflation, comprising a base for positioning a truck wheel holding a tire, at least four rigid heavy metal upright supports circumscribing the space occupied by the tire and fixed solidly to the base, a top section fastened to the supports, rigid heavy metal cross members fastened securely between the supports to prevent sudden escape of the tire rim, at least one movable member serving as a closure between the supports to allow entry of the tire into the guard, protruding members extending from the base at right angles to the plane of the main axis of the tire-circumscribing space and of such dimensions as to prevent capsizing of the guard, and means for locking said member in closed position after the wheel is placed in the guard.

2. A tire inflation guard according to claim 1 in which the base is provided with stops disposed substantially perpendicularly to the plane of the wheel to position the wheel.

3. A truck tire inflation guard for inflating a tire mounted on a disk wheel comprising a base for positioning the wheel, at least four rigid heavy metal upright supports fastened to the base and forming a rectangular space circumscribing the tire, the long side of the rectangle being adjacent to the side of the wheel, a rigid heavy metal top section fastened to the supports, rigid heavy metal cross members fastened securely between the supports to prevent sudden escape of the tire rim, at least one movable rigid heavy metal member serving as a closure between the supports to allow entry of the wheel into the guard, an upright member positioned about in the middle of a long side of the rectangle, fastened securely to the base and at least one cross member, and means for locking said movable member in closed position after the wheel is placed in the guard.

4. A tire inflation guard according to claim 3 in which the upright member positioned about in the middle of a long side is provided with means for securing the disk wheel to said upright member.

5. A tire inflation guard according to claim 3 in which the upright member positioned about in the middle of a long side is provided with an opening of such dimensions and elevation to enable securing of the disk wheel to said upright member by passing a stud through said opening and engaging it with the hub of the disk wheel.

NATHAN WINARSKY.
BENJAMIN WINARSKY.